United States Patent
Gagne-Keats et al.

(10) Patent No.: US 11,979,647 B2
(45) Date of Patent: *May 7, 2024

(54) OPERATION OF AN ELECTRONIC DEVICE AS A WEB CAMERA

(71) Applicant: OSOM Products, Inc., Cupertino, CA (US)

(72) Inventors: Jason Sean Gagne-Keats, Cupertino, CA (US); David John Evans, V., Portola Valley, CA (US); Jean-Baptiste Charles Theou, Sene (FR); Gary Anderson, San Mateo, CA (US); Gary Bisson, Paris (FR); Nicholas Franco, San Jose, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,256

(22) Filed: Nov. 22, 2022

(65) Prior Publication Data

US 2023/0080551 A1    Mar. 16, 2023

Related U.S. Application Data

(63) Continuation of application No. 17/660,983, filed on Apr. 27, 2022, now Pat. No. 11,539,865.
(Continued)

(51) Int. Cl.
*H04N 23/51*    (2023.01)
*G06F 3/16*    (2006.01)
(Continued)

(52) U.S. Cl.
CPC ........... *H04N 23/51* (2023.01); *G06F 3/165* (2013.01); *H04L 65/403* (2013.01); *H04N 23/54* (2023.01); *H04N 23/661* (2023.01)

(58) Field of Classification Search
CPC ..... A47C 17/52; A61B 3/111; F21V 33/0052; G06F 3/165; G06T 19/006; H04L 51/224;
(Continued)

(56) References Cited

U.S. PATENT DOCUMENTS 7,631,979 B1 * 12/2009 Brown ................ F21V 33/0052
362/11
8,624,111 B2    1/2014 Tages et al.
(Continued)

FOREIGN PATENT DOCUMENTS

BR    PI0502601 A    3/2007
WO    2018194557 A1    10/2018

*Primary Examiner* — Gerald Gauthier
(74) *Attorney, Agent, or Firm* — Perkins Coie LLP; Alberto Araiza

(57) ABSTRACT

Methods, apparatuses, and systems for operating an electronic device as a web camera are disclosed. The disclosed embodiments relate to features that enable a user to operate a mobile device as a webcam. A smartphone case can hold a smartphone and be attached to a display, such as a laptop monitor or a flatscreen monitor, with a camera of the smartphone pointed at the user. The smartphone case can include a magnet, which triggers a Hall effect sensor inside the laptop or flatscreen monitor. The sensor can be used to trigger software that enables the smartphone and laptop or computer to pair with each other, e.g., by a Bluetooth handshake. The laptop or computer can accept a Wi-Fi or physical signal, such as via USB, from the smartphone and treat that input as a video stream into the laptop or computer.

20 Claims, 5 Drawing Sheets

Related U.S. Application Data

(60) Provisional application No. 63/180,551, filed on Apr. 27, 2021.

(51) Int. Cl.
*H04L 65/403* (2022.01)
*H04N 23/54* (2023.01)
*H04N 23/661* (2023.01)

(58) Field of Classification Search
CPC .. H04L 65/403; H04N 7/141; H04N 21/4143; H04N 23/51; H04N 23/54; H04N 23/661; H04N 23/66
See application file for complete search history.

(56) References Cited

U.S. PATENT DOCUMENTS

| | | | |
|---|---|---|---|
| 9,185,248 B2 * | 11/2015 | Earnshaw | H04N 23/66 |
| 9,531,424 B1 | 12/2016 | Tucker | |
| 10,694,145 B1 | 6/2020 | Skinner et al. | |
| 10,955,494 B2 | 3/2021 | Renda et al. | |
| 11,539,865 B2 * | 12/2022 | Gagne-Keats | H04L 65/403 |
| 2004/0145653 A1 | 7/2004 | Choi | |
| 2005/0090299 A1 | 4/2005 | Tsao et al. | |
| 2006/0158439 A1 | 7/2006 | Luo et al. | |
| 2007/0200917 A1 | 8/2007 | Chen et al. | |
| 2007/0264983 A1 | 11/2007 | Chen et al. | |
| 2011/0070828 A1 | 3/2011 | Griffin et al. | |
| 2011/0070837 A1 | 3/2011 | Griffin et al. | |
| 2011/0085046 A1 * | 4/2011 | Seo | H04N 21/4143 348/207.1 |
| 2011/0088163 A1 * | 4/2011 | Luft-Weissberg | A47C 17/52 5/2.1 |
| 2012/0098271 A1 | 4/2012 | Bayer et al. | |
| 2012/0127319 A1 | 5/2012 | Rao et al. | |
| 2013/0169736 A1 | 7/2013 | Lindblom et al. | |
| 2013/0222627 A1 * | 8/2013 | Earnshaw | H04N 23/661 348/E5.042 |
| 2013/0314413 A1 * | 11/2013 | Coon | A61B 3/111 345/420 |
| 2014/0068692 A1 | 3/2014 | Archibong et al. | |
| 2014/0118468 A1 * | 5/2014 | Purdy | H04N 7/141 348/14.08 |
| 2014/0219626 A1 | 8/2014 | Weber | |
| 2015/0015723 A1 | 1/2015 | Huang | |
| 2015/0174499 A1 | 6/2015 | Rosenheck | |
| 2015/0371447 A1 * | 12/2015 | Yasutake | G06T 19/006 345/633 |
| 2016/0359525 A1 | 12/2016 | Griffin et al. | |
| 2017/0079257 A1 | 3/2017 | Haensgen et al. | |
| 2017/0163788 A1 | 6/2017 | Andersen et al. | |
| 2017/0180523 A1 | 6/2017 | Fernandes et al. | |
| 2018/0081514 A1 * | 3/2018 | Bostick | H04L 51/224 |
| 2018/0097927 A1 | 4/2018 | Skulina et al. | |
| 2018/0294830 A1 | 10/2018 | Osmanski et al. | |
| 2019/0137728 A1 | 5/2019 | Wan et al. | |
| 2021/0303253 A1 | 9/2021 | Hwang et al. | |
| 2022/0345593 A1 * | 10/2022 | Gagne-Keats | H04N 23/51 |
| 2023/0080551 A1 * | 3/2023 | Gagne-Keats | H04L 65/403 348/14.02 |

* cited by examiner

OPERATION OF AN ELECTRONIC DEVICE AS A WEB CAMERA

CROSS-REFERENCE TO RELATED APPLICATIONS

This application is a continuation of U.S. patent application Ser. No. 17/660,983, filed Apr. 27, 2022, which claims the benefit of U.S. Provisional Patent Application No. 63/180,551, filed Apr. 27, 2021. The aforementioned applications are incorporated herein by reference in their entirety.

TECHNICAL FIELD

The present disclosure is generally related to cameras that feed or stream an image or video in real time.

BACKGROUND

Webcams can be built into laptops to feed or stream an image or video in real time to or through a computer network, such as the Internet. However, webcams are typically not built into flatscreen monitors that are attached to docking stations or laptops. Such flatscreen monitors can therefore need the additional expense of a separate webcam. Moreover, the maximum resolution of webcams is lower than most smartphones or tablets, and webcams can malfunction when the correct driver is not installed on a host computer.

DETAILED DESCRIPTION

Figure 1:
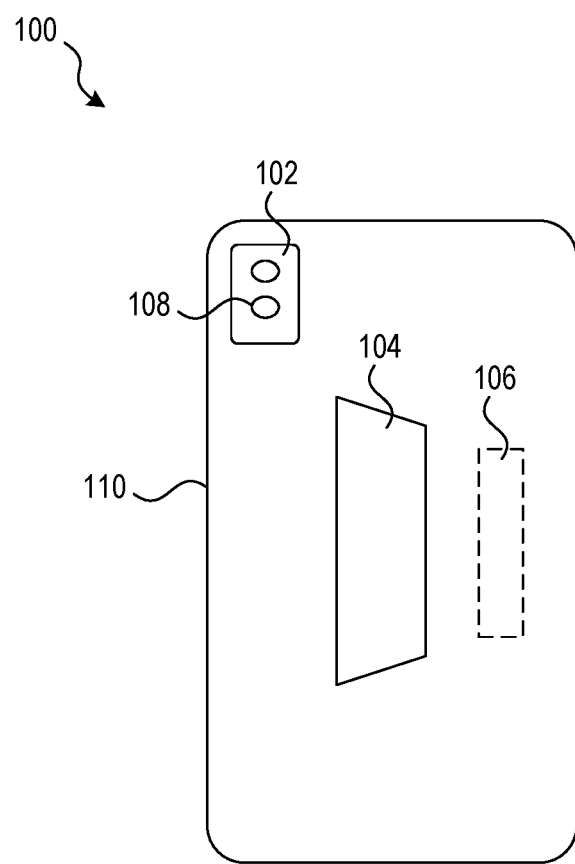
FIG. 1 is a drawing illustrating an example electronic device to be operated as a web camera, in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "610") can implement components, operations, or structures (e.g., "610a") described as a single instance. Further, plural instances (e.g., "610") refer collectively to a set of components, operations, or structures (e.g., "610a") described as a single instance. The description of a single component (e.g., "610a") applies equally to a like-numbered component (e.g., "610b") unless indicated otherwise. These and other aspects, features, and implementations can be expressed as methods, apparatuses, systems, components, program products, means or steps for performing a function, and in other ways. These and other aspects, features, and implementations will become apparent from the following descriptions, including the claims.

A mobile device or handheld electronic device is a portable computing device such as a smartphone, fitness tracker, smartwatch, or other wearable electronic device. A typical mobile device includes communications circuitry and other components configured to access wireless networks and other devices. For example, a mobile device can be a mobile personal computer with a mobile operating system including features useful for mobile or handheld use. Most smartphones, tablets, and smartwatches have the ability to place and receive voice/video calls, and create and receive text messages. Smartphones and other mobile devices can have personal digital assistants, an event calendar, a media player, video games, Global Positioning System (GPS) navigation, digital cameras, etc. Mobile devices can include multiple cameras, such as a front and rear camera, with the ability to capture video and photographs. These cameras are capable of capturing video at higher resolutions and frame rates, making them suitable for a variety of applications.

The embodiments disclosed herein describe methods, apparatuses, and systems for operating an electronic device as a web camera (webcam). The disclosed embodiments relate to features that enable a user to operate a mobile device as a webcam. For example, the smartphone case disclosed can hold a smartphone and be attached to a display, such as a laptop monitor or a flatscreen monitor, with a camera of the smartphone pointed at the user. The smartphone case can include a magnet, which triggers a Hall effect sensor inside the laptop or flatscreen monitor. The sensor can be used to trigger software that enables the smartphone and laptop or computer to pair with each other, e.g., by a Bluetooth handshake. The laptop or computer can accept a Wi-Fi or physical signal, such as via USB, from the smartphone and treat that input as a video stream into the laptop or computer.

In some embodiments, a case for operating a mobile device as a webcam includes a housing including at least one of rubber, plastic, leather, or silicone. The housing is configured to house a mobile device having a first camera disposed on a first side of the mobile device and a second camera disposed on a second side of the mobile device opposite to the first side. The housing is shaped to expose the first camera and the second camera for capturing images when the mobile device is housed by the housing. A fastener is attached to the housing and configured to attach the case to a frame of an electronic display in a first configuration, such that the first camera faces a user facing a screen of the electronic display. The fastener enables the housing to be rotated on the fastener into a second figuration, such that the second camera faces the user. A magnet is disposed within or attached to the housing and configured to trigger a Hall effect sensor disposed within the electronic display or a computer communicably coupled to the electronic display. The magnet causes the computer to pair wirelessly with the mobile device based on triggering the Hall effect sensor. The computer is caused to initiate communication between the mobile device and the computer based on pairing wirelessly with the mobile device, such that the mobile device is configured to stream images or video to the computer using at least one of the first camera or the second camera.

In some embodiments, the housing is configured to house at least one of a smartphone, a tablet, a fitness tracker, or a smartwatch.

In some embodiments, the magnet is configured to cause the computer to initiate the communication, such that the mobile device is configured to stream audio recorded by a microphone of the mobile device to the computer.

In some embodiments, the video is first video, and the magnet is configured to cause the computer to initiate the communication, such that the mobile device is configured to send, to the computer, at least one of second video that mirrors a display of the mobile device, or files comprising at least one of images or documents.

In some embodiments, a case for a mobile device includes a housing configured to house a mobile device having a camera. A fastener is attached to the housing and configured to attach the housing to a frame of an electronic display, such that the camera faces a user facing a screen of the electronic display. A magnet is disposed within or attached to the housing and configured to trigger a sensor disposed within the electronic display or a computer communicably coupled to the electronic display. The magnet causes the computer to configure the mobile device to send data to the computer in response to triggering of the sensor.

In some embodiments, the housing comprises at least one of rubber, plastic, leather, or silicone.

In some embodiments, the housing defines an opening overlaying the camera to expose a lens of the camera when the mobile device is housed by the housing.

In some embodiments, the housing comprises a transparent portion configured to overlay the camera to expose a lens of the camera when the mobile device is housed by the housing.

In some embodiments, the fastener comprises at least one of an adjustable clamp, a clip, a strap, an adhesive strip, or a foldable element.

In some embodiments, the camera is a first camera disposed on a first side of the mobile device, the mobile device has a second camera disposed on a second side of the mobile device opposite to the first side, and the fastener is configured to enable the housing to be rotated on the fastener, such that the second camera faces the user.

In some embodiments, the magnet is configured to cause the computer to pair wirelessly with the mobile device based on triggering the sensor.

In some embodiments, the sensor is a Hall effect sensor.

In some embodiments, a method for operating a mobile device as a webcam includes detecting, by a sensor of a computer, a magnetic field emitted by a magnet disposed within or attached to a case housing the mobile device when the case is in proximity to the computer. The case includes at least one of rubber, plastic, leather, or silicone. In response to detecting the magnetic field, the computer pairs wirelessly to the mobile device using a first network connection. The computer configures the mobile device to stream images or video captured by at least one camera of the mobile device to the computer using a second network connection.

In some embodiments, the computer is a first computer. The method includes initiating, by the first computer, a video call with a second computer. The first computer sends the images or the video stream to the second computer in the video call.

In some embodiments, the second network connection is the first network connection.

In some embodiments, the first network connection comprises Bluetooth and the second network connection comprises Wi-Fi.

In some embodiments, the first network connection comprises Bluetooth or Wi-Fi and the second network connection comprises universal serial bus (USB).

In some embodiments, the computer configures the mobile device to stream audio recorded by a microphone of the mobile device to the computer.

In some embodiments, the video is first video. The method includes configuring, by the computer, the mobile device to stream second video that mirrors a display of the mobile device to the computer.

In some embodiments, configuring the mobile device to stream the images or video is performed in response to detecting a change in light by an ambient light sensor of the computer.

The advantages and benefits of the methods, systems, and apparatuses disclosed herein include higher-resolution cameras (e.g., 12 MP f/1.5 main sensors having 1.9 µm pixels), telephoto lenses, and optical zoom functions. Mobile device cameras perform better than webcams in low-light environments. Further, the artificial intelligence (AI) optimization modes of smartphones can tweak images and video feeds to render them higher quality. The apparatuses disclosed can be used for switching between a wider field of view or a zoomed in one. Moreover, mobile device camera video streams can benefit from optical image stabilization, digital image stabilization, and image processing.

FIG. 1 is a drawing illustrating an example electronic device to be operated as a web camera, in accordance with one or more embodiments. In embodiments, a case 100 is used for housing a mobile device and operating the mobile device as a webcam. A webcam is a video camera that feeds or streams an image or video in real time to or through a computer network, such as the Internet. Webcams are typically small cameras that sit on a desk, attach to a user's monitor, or are built into the hardware. Webcams can be used during a video chat session involving two or more people, with conversations that include live audio and video.

The case 100 includes a housing 110 made of at least one of rubber, plastic, leather, or silicone. The housing 110 is configured to house (e.g., encase, hold, enclose, etc.) a mobile device. The mobile device can be a smartphone, a tablet, a fitness tracker, or a smartwatch. In embodiments, the mobile device has a first camera 108 disposed on a first side (the side shown in FIG. 1) of the mobile device. In embodiments, the mobile device has a second camera disposed on a second side of the mobile device opposite to the first side. An example second camera 524 on an example second side 528 of an example mobile device 504 is illustrated and described in more detail with reference to FIG. 5. Likewise, embodiments of the case 100 can include different and/or additional components or can be connected in different ways.

For example, the case 100 can include the protective housing 110 that holds a smartphone or other handheld device and protects the device against physical damage. The protective housing 110 can be substantially made of plastic, rubber, silicone, leather, etc. The protective housing 110 can enclose four sides of a smartphone. In addition, the protective housing 110 can cover the rear side of the device as shown by FIG. 1. A portion of the housing 110 overlaying a rear camera 108 of the mobile device can be transparent or the protective housing 110 can define an opening 102 that exposes the rear camera 108.

Figure 2:
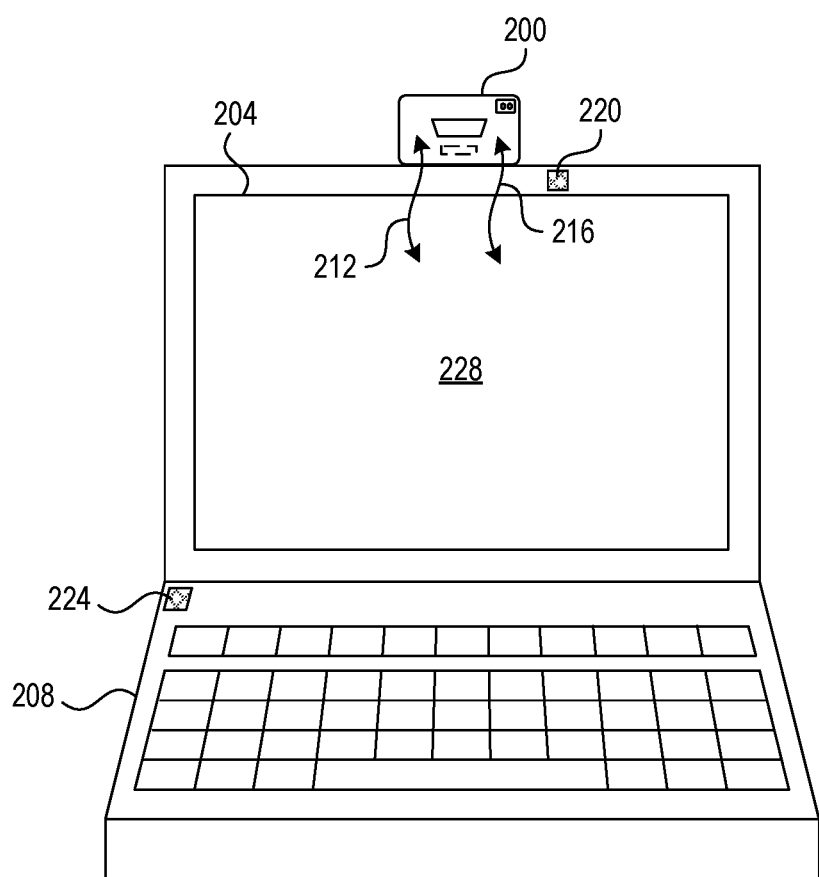
FIG. 2 is a drawing illustrating an example of operating an electronic device as a web camera, in accordance with one or more embodiments.

In embodiments, the housing 110 is shaped to expose the first camera 108 and the second camera for capturing images when the mobile device is housed by the housing 110. For example, the housing 110 can define an opening 102 overlaying the camera 108 to expose a lens of the camera 108 when the mobile device is housed by the housing 110. In another example, the housing 110 includes a transparent portion configured to overlay the camera 108 to expose a lens of the camera 108 when the mobile device is housed by the housing 110. In embodiments, a fastener 104 is attached to the housing. The fastener 104 is configured to attach the case 100 to a frame of an electronic display in a first configuration as shown by FIG. 2. An example frame 204 of an example electronic display is shown in FIG. 2.

In embodiments, a magnet 106 is disposed (e.g., embedded) within or attached to the housing 110. The magnet 106 is configured to trigger a sensor disposed within the electronic display or a computer communicably coupled to the electronic display. An example sensor 220 and example computer 208 are shown by FIG. 2.

Figure 5:
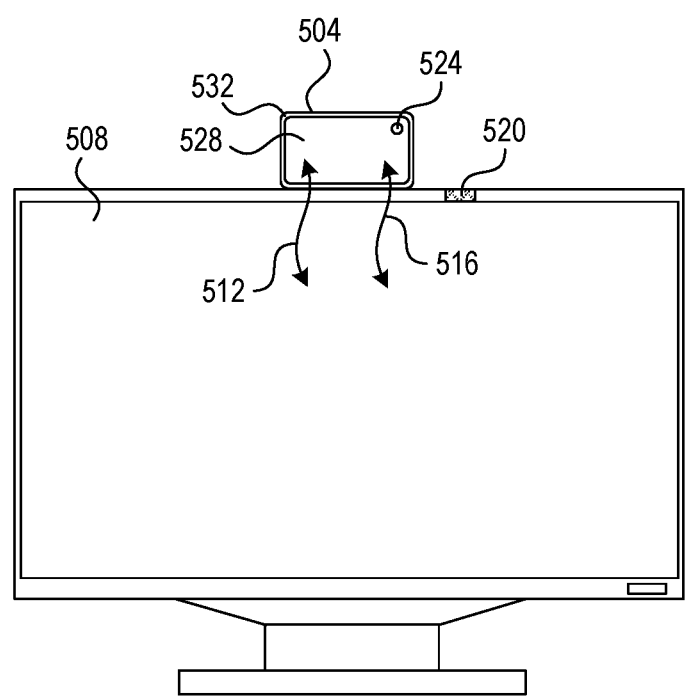
FIG. 5 is a drawing illustrating an example of operating an electronic device as a web camera, in accordance with one or more embodiments.

FIG. 2 is a drawing illustrating an example of operating an electronic device as a web camera, in accordance with one or more embodiments. In embodiments, a housing 200 of the electronic device is attached to a fastener that attaches the housing 200 to a frame 204 or a housing of an electronic display 228. An example fastener 104 is shown by FIG. 1. The electronic display 228 can be a laptop's screen as shown by FIG. 2, or a flatscreen monitor as shown by FIG. 5. In a first configuration, a camera of the electronic device faces a user facing a screen of the electronic display 228. Likewise, embodiments of the system can include different and/or additional components or can be connected in different ways.

The housing 200 can include a fastener and a magnet. The fastener can be configured to attach the housing to a display 228, such as a laptop monitor or television. In embodiments, the fastener includes at least one of an adjustable clamp, a clip, a strap, an adhesive strip, or a foldable element. The fastener can be a clip, strap, adhesive, foldable element, or other suitable mechanism to attach the housing 200 to the electronic display 228. In embodiments, the fastener is configured to attach the housing 200 to a frame 204 of an electronic display 228 in a first configuration, such that a camera of the electronic device faces a user facing a screen of the electronic display 228. For example, the fastener can be positioned such that a rear camera of the electronic device faces a user when the housing 200 is affixed to the electronic display 228. The fastener can be clip on the back of the housing as shown by FIG. 1. In embodiments, the housing can have a folding element that rests the housing on top of the display 228.

A magnet is disposed within or attached to the housing 200. An example magnet 106 is shown by FIG. 1. The magnet triggers a sensor 220 disposed within the electronic display. In embodiments, the sensor is disposed within a computer 208 communicably coupled to the electronic display. The sensor 220 can be a Hall effect sensor. A Hall effect sensor (or simply Hall sensor) is a type of sensor which detects the presence and magnitude of a magnetic field (e.g., generated by the magnet of the housing 200) using the Hall effect. The output voltage of a Hall sensor is directly proportional to the strength of the field. In embodiments, the magnet is a permanent magnet and the sensor 220 is a leaf sensor. The magnet can be a neodymium magnet. Advantageously, neodymium magnets have a smaller size.

The sensor 220 can cause the computer 208 to configure the mobile device to send data to the computer 208 in response to triggering of the sensor 220. For example, the data can be sent over the network connection 216, which can be any short range wireless network or universal serial bus (USB).

In embodiments, the computer 208 can be physically uncoupled but communicably coupled to the electronic display 228. In other embodiments as shown by FIG. 2, the computer 208 is a laptop and the electronic display 228 is the screen of the laptop. For example, the laptop includes a display housing and a keyboard housing. The laptop includes sensor 220 in the display housing and a corresponding magnet in the keyboard housing. The sensor 220 detects an applied magnetic field by generating a voltage in response to the magnetic field as an electric current runs through the sensor 220, i.e., by the Hall effect. When the laptop is closed, the magnet in the keyboard housing is brought into proximity of the sensor 220, which triggers the sensor 220. The laptop can be configured, such as by software, to perform an action when the Hall effect sensor 220 is triggered. For example, the laptop's operating system can enter a sleep mode in response to triggering of the sensor 220.

In embodiments, the magnet in the housing 200 triggers the sensor 220 in the laptop when the housing 200 is attached to the display 228. The strength of the magnet can be chosen to trigger the sensor 220 when brought within a desired distance. For example, as shown in FIG. 2, the magnet is adjacent to the sensor 220 in the display housing of the laptop, activating the sensor 220. Triggering the sensor 220 can cause the laptop to use the electronic device's camera as a webcam. In some embodiments, a laptop's sensor can be in a different portion, such as in the keyboard housing, or the laptop can have multiple sensors. The laptop can be configured to perform different actions depending on the placement of the triggered sensors, such as using the electronic device's camera as a webcam.

In embodiments, the sensor 220 causes the computer 208 to pair wirelessly with the mobile device in response to triggering of the sensor 220. For example, the sensor 220 can activate software on the computer 208 to run a software routine to cause the computer 208 to pair wirelessly with the mobile device. In another example, the computer 208 can include a circuit that uses a current or voltage generated by the sensor 220 as input. When the circuit senses the current or voltage generated by the sensor 220 in response to the sensor 220 being triggered by the magnet, the circuit causes the computer 208 to pair wirelessly with the mobile device. The pairing is a process that helps set up an initial linkage between the electronic device and the computer 208 to allow communications between them. For example, Bluetooth pairing can be used to link the electronic device and the computer 208. The laptop can be configured, such as by software, to cause the laptop to pair with the electronic device when a Hall effect sensor is triggered. This pairing can be via Bluetooth.

Once the laptop and electronic device are paired, the laptop's software can cause the laptop to expect or accept other communications signals from the electronic device, such as a Wi-Fi signal or a USB signal. These communication signals can include data such as a video stream captured by a camera of the electronic device, such as a rear camera or front camera. This allows the electronic device to function as a webcam.

In embodiments, the magnet is configured to cause the computer 208 to initiate the communication, such that the electronic device is configured to stream audio recorded by a microphone of the electronic device to the computer 208. For example, the communications signals can also include audio recorded by a microphone integrated into the electronic device.

The laptop is not limited to receiving video or audio streams being captured by the electronic device. In embodiments, video captured by a camera of the electronic device is first video. The magnet is configured to cause the computer 208 to initiate the communication, such that the electronic device is configured to send, to the computer 208, at least one of second video that mirrors a display of the electronic device, or files comprising at least one of images or documents. For example, the laptop can receive video that mirrors the electronic device's display. In another example, triggering the sensor 220 can cause the electronic device to transfer files to the laptop, such as photos or documents. In embodiments, the software or the circuit of the computer 208 causes the computer 208 to initiate communication between the electronic device and the computer 208 in response to the pairing. The electronic device is configured to stream images or video captured a camera of the electronic device to the computer 208. An example camera 108 is shown by FIG. 1.

In some embodiments, the laptop can be configured to perform the described actions in response to other sensors 224 or a combination of sensors being triggered. For example, the laptop can be configured to use the electronic device's camera as a webcam in response to a change detected by an ambient light sensor 224 of the laptop. In this example, a user can attach the housing 200 to the laptop and cover the ambient light sensor 224, which then causes the laptop to use the electronic device's camera as a webcam.

Figure 3:
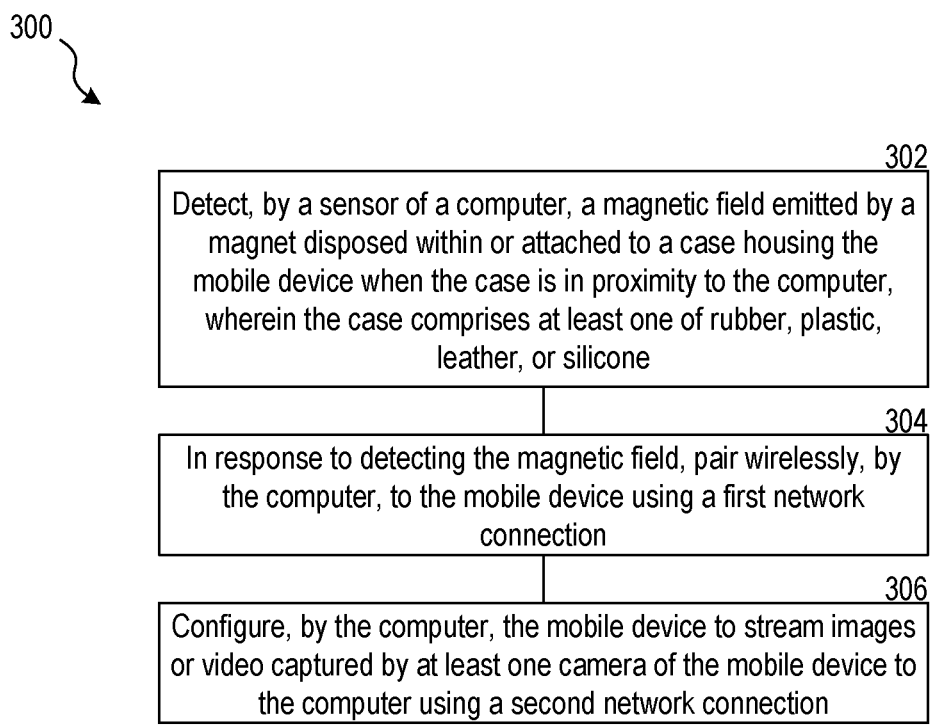
FIG. 3 is a flow diagram illustrating an example process for operating an electronic device as a web camera, in accordance with one or more embodiments.

FIG. 3 is a flow diagram illustrating an example process 300 for operating an electronic device as a web camera, in accordance with one or more embodiments. In some embodiments, the process 300 of FIG. 3 is performed by the computer 208. The computer 208 is illustrated and described in more detail with reference to FIG. 2. In other embodiments, the process 300 of FIG. 3 is performed by a computer system, e.g., the example computer system 400 illustrated and described in more detail with reference to FIG. 4. Particular entities, for example, software loaded within the computer 208, firmware of the computer 208, or a hardware circuit of the computer 208 perform some or all of the steps of the process 300 in other embodiments. Likewise, embodiments can include different and/or additional steps, or perform the steps in different orders.

In step 302, a sensor of the computer 208 detects a magnetic field emitted by a magnet disposed within or attached to a case housing a mobile device when the case is in proximity to the computer 208. An example magnet 106 and example case 100 are shown by FIG. 1. The case includes at least one of rubber, plastic, leather, or silicone. An example sensor 220 is shown by FIG. 2. For example, a magnetic field is detected. The magnetic field can be detected by a Hall effect sensor within a housing of an electronic display and emitted by a magnet in a case that houses the mobile device.

In step 304, in response to detecting the magnetic field, the computer 208 pairs wirelessly to the mobile device using a first network connection 212. The first network connection 212 is shown by FIG. 2. For example, the mobile device is paired in response to detecting the magnetic field. This pairing can be via Bluetooth and initiated by software running on the computer 208.

In step 306, the computer 208 configures the mobile device to stream images or video captured by at least one camera of the mobile device to the computer 208 using a second network connection 216. The second network connection 216 is shown by FIG. 2. For example, video data is received from the mobile device. The video data can be captured by a camera of the mobile device, so that the mobile device functions as a webcam. In embodiments, the computer 208 is a first computer. The first computer 208 initiates a video call with a second computer. The first computer 208 transmits images or the video stream to the second computer in the video call.

In embodiments, the second network connection 216 is the same as the first network connection 212. In embodiments, the first network connection 212 is Bluetooth and the second network connection 216 is Wi-Fi. In embodiments, the first network connection 212 is Bluetooth or Wi-Fi and the second network connection 216 is universal serial bus (USB). In embodiments, the computer 208 configures the mobile device to stream audio recorded by a microphone of the mobile device to the computer 208. In embodiments, the streaming video is first video. The computer 208 configures the mobile device to stream second video that mirrors a display of the mobile device to the computer 208. Configuring the mobile device to stream the images or video can be performed in response to detecting a change in light by an ambient light sensor 224 (see FIG. 2) of the computer 208

Figure 4:
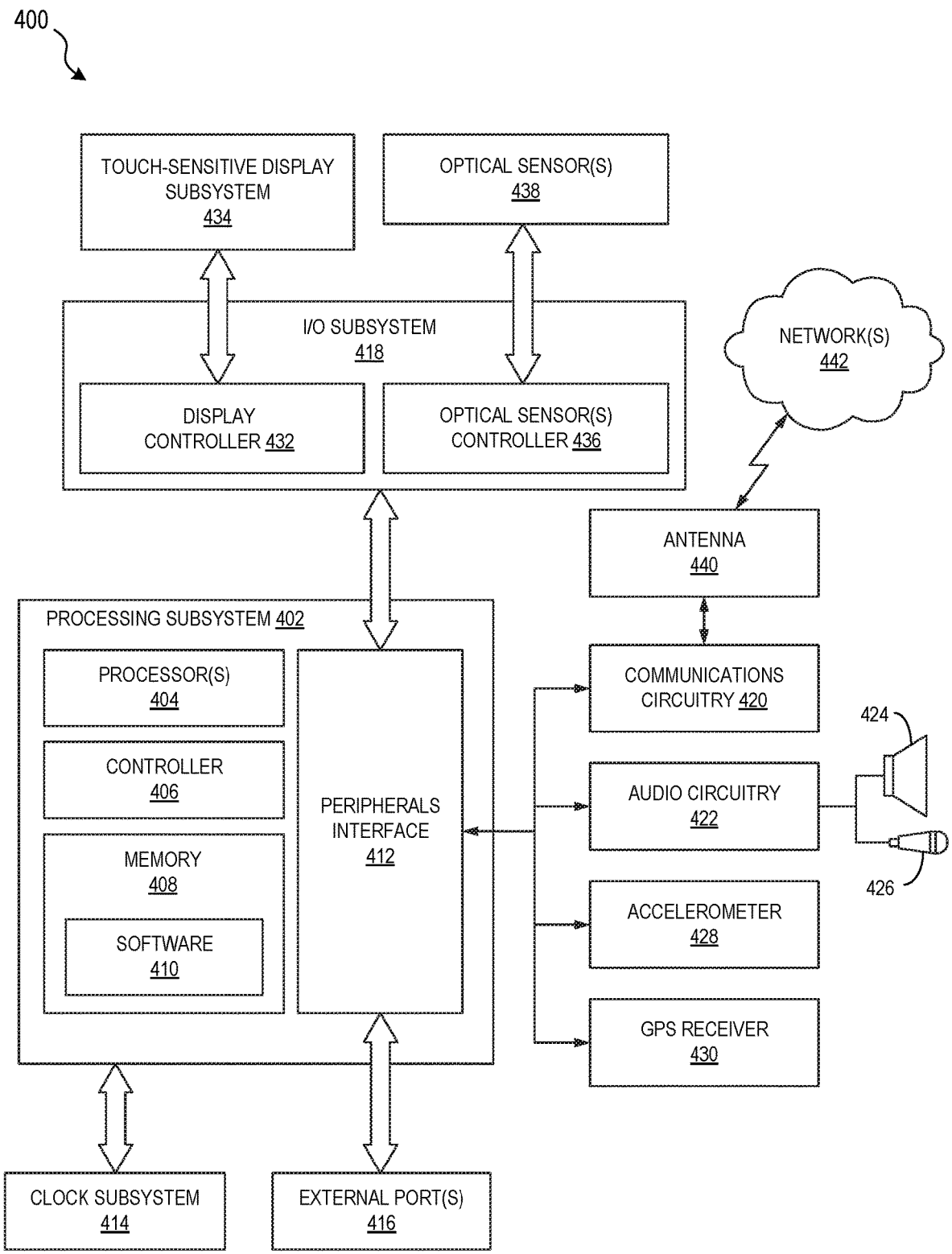
FIG. 4 is a block diagram illustrating an example computer system, in accordance with one or more embodiments.

FIG. 4 is a block diagram illustrating an example computer system 400, in accordance with one or more embodiments. Components of the example computer system 400 can be used to implement a mobile device, the computer 208, etc. Likewise, embodiments of the system 400 can include different and/or additional components or can be connected in different ways. For example, the computer system 400 can be used to implement the mobile device of FIG. 1 that is placed in the case 100. The computer system 400 can include generic components and/or components specifically designed to carry out the disclosed technology. The computer system 400 may be a standalone device or part of a distributed system that spans networks, locations, machines, or combinations thereof. For example, components of the computer system 400 may be included in or coupled to a system-on-chip (SOC), a single-board computer (SBC) system, a desktop or laptop computer, a kiosk, a mainframe, a mesh of computer systems, or combinations thereof.

In some embodiments, the computer system 400 can operate as a server device or a client device in a client-server network environment, or as a peer machine in a peer-to-peer system. In some embodiments, the computer system 400 may perform one or more steps of the disclosed embodiments in real-time, near real-time, offline, by batch processing, or combinations thereof.

The computer system 400 includes a processing subsystem 402 that includes one or more processors 404 (e.g., Central Processing Units (CPUs), Application Specific Integrated Circuits (ASICs), and/or Field Programmable Gate Arrays (FPGAs)), a memory controller 406, memory 408 that can store software 410, and a peripherals interface 412. The memory 408 may include volatile memory (e.g., random-access memory (RAM)) and/or non-volatile memory (e.g., read-only memory (ROM)). The memory 408 can be local, remote, or distributed. The computer system 400 can also include a clock subsystem 414 that controls a timer for use in some embodiments. The components of the computer system 400 are interconnected over a bus (not shown) operable to transfer data between hardware components.

The peripherals interface 412 is coupled to one or more external ports 416, which can connect to an external power source, for example. The peripherals interface 412 is also coupled to an I/O subsystem 418. Other components coupled to the peripherals interface 412 include communications circuitry 420, audio circuitry 422 for a speaker 424 and a microphone 426, an accelerometer 428, a GPS receiver 430 (or Global Navigation Satellite System (GLONASS) or other global navigation system receiver), and other sensors (not shown). The GPS receiver 430 is operable to receive signals concerning the geographic location of the computer system 400. The accelerometer 428 can be operable to obtain information concerning the orientation (e.g., portrait or landscape) of computer system 400.

The I/O subsystem 418 includes a display controller 432 operative to control a touch-sensitive display system 434, which further includes the touch-sensitive display of the computer system 400. The I/O subsystem 418 also includes an optical sensor(s) controller 436 for one or more optical sensors 438 of the computer system 400. The I/O subsystem 48 includes other components (not shown) to control physical buttons such a "home" button.

The communications circuitry 420 can configure the antenna 440 of the computer system 400. In some embodiments, the antenna 440 is structurally integrated with the computer system 400 (e.g., embedded in the housing 110 or display screen) or coupled to the computer system 400 through the external ports 416. The communications circuitry 420 can convert electrical signals to/from electromagnetic signals that are communicated by the antenna 440 to networks 442 or other devices. For example, the communications circuitry 420 can include radio frequency (RF) circuitry that processes RF signals communicated by the antenna 440.

The communications circuitry 420 can include circuitry for performing well-known functions such as an RF transceiver, one or more amplifiers, a tuner, oscillators, a digital signal processor, a CODEC chipset, a subscriber identity module (SIM card or eSIM), and so forth. The communications circuitry 420 may communicate wirelessly via the antenna elements 440 with the networks 442 (e.g., the Internet, an intranet and/or a wireless network, such as a cellular network, a wireless local area network (LAN) and/or a metropolitan area network (MAN)) or other devices.

The software 410 can include an operating system (OS) software program, application software programs, and/or modules such as a communications module, a GPS module, and the like. For example, the GPS module can estimate the location of the computer system 400 based on the GPS signals received by the GPS receiver 430. The GPS module can provide this information to components of the computer system 400 for use in various applications (e.g., to provide location-based access to service providers).

A software program, when referred to as "implemented in a computer-readable storage medium," includes computer-readable instructions stored in the memory (e.g., memory 408). A processor (e.g., processor 404) is "configured to execute a software program" when at least one value associated with the software program is stored in a register that is readable by the processor. In some embodiments, routines executed to implement the disclosed embodiments may be implemented as part of OS software (e.g., MICROSOFT WINDOWS and LINUX) or a specific software application, component, program, object, module, or sequence of instructions referred to as "computer programs."

Computer programs typically comprise one or more instructions set at various times in various memory devices of a computing device (e.g., computer system 400), which, when read and executed by at least one processor (e.g., processor 404), will cause the computer system 400 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 408).

Operation of a memory device (e.g., memory 408), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

The computer system 400 can be any type of electronic device that can communicate wirelessly with a network node and/or with another handheld device in a cellular, computer, and/or mobile communications system. Examples of a handheld device include smartphones (e.g., APPLE IPHONE, SAMSUNG GALAXY, NOKIA LUMINA), tablet computers (e.g., APPLE IPAD, SAMSUNG NOTE, AMAZON FIRE, MICROSOFT SURFACE), wireless devices capable of machine-to-machine (M2M) communication, wearable electronic devices, and any other handheld device that is capable of accessing the networks 442.

The computer system 400 may store and transmit (e.g., internally and/or with other electronic devices over a network) code (composed of software instructions) and data using machine-readable media, such as non-transitory machine-readable media (e.g., machine-readable storage media such as magnetic disks, optical disks, read only memory (ROM), flash memory devices, and phase change memory) and transitory machine-readable transmission media (e.g., electrical, optical, acoustical, or other forms of propagated signals, such as carrier waves or infrared signals).

The computer system 400 can include hardware such as one or more processors coupled to one or more other components, such as non-transitory machine-readable media to store code and/or data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on processor(s) of that electronic device. One or more parts of an embodiment of the present disclosure may be implemented using different combinations of software, firmware, and/or hardware.

The networks 442 may include any combination of private, public, wired, or wireless systems such as a cellular telephone network, a computer network, the Internet, and the like. Any data communicated over the network(s) 442 may be encrypted or unencrypted at various locations or along different portions of the networks. Examples of wireless systems include Wideband Code Division Multiple Access (WCDMA), High Speed Packet Access (HSPA), WiMax, Wi-Fi, Wireless Local Area Network (WLAN), and Global System for Mobile Communications (GSM), GSM Enhanced Data Rates for Global Evolution (EDGE), Radio Access Network (GERAN), and other systems that may also benefit from exploiting the scope of this disclosure.

The computer system 400 may use a variety of communications standards, protocols, number of frequency bands, frequencies, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), 3rd Generation Partnership Project (3GPP) related standards, BLUETOOTH, Wireless Fidelity (Wi-Fi) (e.g., IEEE 802.11a, 802.11b, 802.11g, 802.11n, 802.11ad, 802.11ay), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The computer system 400 may include other components that are not shown nor further discussed herein for the sake of brevity. One having ordinary skill in the art will understand any hardware and software that is included but not shown in FIG. 4. While embodiments have been described in the context of fully functioning handheld devices, those skilled in the art will appreciate that the various embodiments are capable of being distributed as a program product in a variety of forms and that the disclosure applies equally, regardless of the particular type of machine or computer-readable media used to actually effect the embodiments.

FIG. 5 is a drawing illustrating an example of operating a mobile device 504 as a web camera, in accordance with one or more embodiments. The mobile device 504 can be mounted on top of a computer monitor 508. The computer monitor 508 does not have an integrated camera or webcam. The mobile device 504 sits on top of the monitor 508, e.g., using an adjustable clamp (e.g., the fastener 104 of FIG. 1) that braces itself against the back of the monitor 508 to secure the mobile device 504. Likewise, embodiments of the system 100 can include different and/or additional components or can be connected in different ways.

The housing 532 can include a fastener having a flexible base that can be used as a stand or as a clip to secure the mobile device 504 to the monitor 508. In embodiments, the fastener can be adjusted until a correct lens height of the mobile device 504 is achieved. In embodiments, the fastener is attached to the housing 532 and configured to attach the housing 532 to a frame of the monitor 508 in a first configuration (see FIG. 2), such that a first camera of the mobile device 504 faces a user facing a screen of the monitor 508. The fastener can enable the housing 532 to be rotated on the fastener into a second figuration (shown by FIG. 5), such that a second camera on the side 528 of the mobile device 504 faces the user.

In embodiments, the housing 532 attaches magnetically to a side of the mobile device 504. The housing 532 can have folds, dividing the housing 532 into portions, so it can be maneuvered to create a stand for the mobile device 504. The housing 532 can be used to prop the mobile device 504 up in an upright position for video calling. To expose a rear-facing HD video camera on the mobile device 504, the housing 532 can also be folded in half. The housing 532 aligns with the front screen of the mobile device 504 and is designed to add very little thickness to the overall profile of the mobile device 504.

A magnet is disposed within or attached to the housing 532. An example magnet 106 is shown by FIG. 1. The magnet is configured to trigger a sensor 520 disposed within an electronic display (as shown by FIG. 5) or within a computer communicably coupled to the electronic display (monitor 508). The sensor 520 (triggered by the magnet) causes a computer to configure the mobile device 504 to send data to the computer in response to triggering of the sensor 520. For example, in response to detecting a magnetic field, the computer pairs wirelessly to the mobile device 504 using a first network connection. The computer configures the mobile device 504 to stream images or video captured by at least one camera of the mobile device 504 to the computer using a second network connection 516.

In embodiments, the sensor 520 is a reed switch operated by the applied magnetic field by the magnet. The sensor 520 can include a pair of ferromagnetic flexible metal contacts in a hermetically sealed glass envelope. The contacts are normally open, closing when a magnetic field is present, or they may be normally closed and open when a magnetic field is applied. The sensor 520 may be actuated by an electromagnetic coil in the housing 532, making a relay, or by bringing the magnet near it. When the magnetic field is removed, the contacts in the sensor 520 return to their original position.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A method for operating a mobile device as a webcam, the method comprising:
   detecting, by a sensor of a computer, a magnetic field emitted by a magnet disposed within or attached to a case housing the mobile device,
      wherein the case is in proximity to the computer, and
      wherein the case comprises a fastener configured to attach the case to a frame of an electronic display of the computer such that at least one camera of the mobile device faces a user facing a screen of the electronic display;
   in response to detecting the magnetic field, pairing wirelessly, by the computer, to the mobile device using a first network connection;
   configuring, by the computer, the mobile device to stream images or video captured by the at least one camera to the computer using a second network connection; and
   causing, by the computer, the mobile device to send the images or video to the computer over the second network connection.

2. The method of claim 1, wherein the computer is a first computer, the method comprising:
   initiating, by the first computer, a video call with a second computer; and
   transmitting, by the first computer, the images or video to the second computer in the video call.

3. The method of claim 1, wherein the second network connection is the first network connection.

4. The method of claim 1, wherein the first network connection comprises Bluetooth and the second network connection comprises Wi-Fi.

5. The method of claim 1, wherein the first network connection comprises Bluetooth or Wi-Fi and the second network connection comprises universal serial bus (USB).

6. The method of claim 1, comprising:
   configuring, by the computer, the mobile device to stream audio recorded by a microphone of the mobile device to the computer.

7. The method of claim 1, wherein the video is first video, the method comprising:
   configuring, by the computer, the mobile device to stream second video that mirrors a display of the mobile device to the computer.

8. The method of claim 1, wherein configuring the mobile device to stream the images or video is performed in response to detecting a change in light by an ambient light sensor of the computer.

9. A computer comprising:
   one or more processors; and
   a non-transitory storage medium storing instructions, which when executed by the one or more processors, cause the computer to:
      detect, by a sensor of the computer, a magnetic field emitted by a magnet disposed within or attached to a case housing a mobile device,
         wherein the case is in proximity to the computer, and
         wherein the case comprises a fastener configured to attach the case to a frame of an electronic display of the computer such that at least one camera of the mobile device faces a user facing a screen of the electronic display;
      pair wirelessly to the mobile device using a first network connection; and
      configure the mobile device to stream images or video captured by the at least one camera to the computer using a second network connection.

10. The computer of claim 9, wherein the instructions cause the computer to:
    initiate a video call with a second computer; and
    transmit the images or video to a second computer in the video call.

11. The computer of claim 9, wherein the second network connection is the first network connection.

12. The computer of claim 9, wherein the first network connection comprises Bluetooth and the second network connection comprises Wi-Fi.

13. The computer of claim 9, wherein the first network connection comprises Bluetooth or Wi-Fi and the second network connection comprises universal serial bus (USB).

14. The computer of claim 9, wherein the instructions cause the computer to:
    configure the mobile device to stream audio recorded by a microphone of the mobile device to the computer.

15. The computer of claim 9, wherein the video is first video, and the instructions cause the computer to:
    configure the mobile device to stream second video that mirrors a display of the mobile device to the computer.

16. The computer of claim 9, wherein the computer configures the mobile device to stream the images or video in response to detecting a change in light by an ambient light sensor of the computer.

17. A non-transitory storage medium storing instructions, which, when executed by one or more processors, cause the one or more processors to:
    detect, by a sensor of a computer, a magnetic field emitted by a magnet disposed within or attached to a case housing a mobile device,
       wherein the case is in proximity to the computer, and
       wherein the case comprises a fastener configured to attach the case to a frame of an electronic display of the computer such that at least one camera of the mobile device faces a user facing a screen of the electronic display;
    pair wirelessly to the mobile device using a first network connection; and
    configure the mobile device to stream images or video captured by the at least one camera to the computer using a second network connection.

18. The storage medium of claim 17, wherein the instructions cause the one or more processors to:
    initiate a video call with a second computer; and
    transmit the images or video to a second computer in the video call.

19. The storage medium of claim 17, wherein the second network connection is the first network connection.

20. The storage medium of claim 17, wherein the first network connection comprises Bluetooth and the second network connection comprises Wi-Fi.

\* \* \* \* \*